3,411,965
METHOD OF BONDING POLYHALOCARBON FABRICS TO METAL

Edward C. Hobaica, Mystic, Conn., assignor to General Dynamics Corporation, New York, N.Y., a corporation of Delaware
No Drawing. Filed Sept. 11, 1964, Ser. No. 395,648
6 Claims. (Cl. 156—3)

ABSTRACT OF THE DISCLOSURE

In the particular embodiment of the invention described herein, a fabric layer made of Teflon fibers is bonded to a metal surface by first etching only one side of the fabric layer and then bonding the etched side of the layer to the metal surface with adhesive. In order to etch only one side of the fabric, the other side is coated with a layer of rubber latex which is then dried to form a mask which is impervious to the etching agent.

---

The present invention relates to laminated articles, and more particularly to metal articles having a polytetrafluoroethylene fabric bonded thereto and the method for producing same.

Polytetrafluoroethylene is a relatively new polymeric material possessing several outstanding properties which have been highly advantageous in many fields. The polytetrafluoroethylene is marketed commercially under the trademark "Teflon," which is a product of E. I. du Pont de Nemours & Co. Polytetrafluoroethylene possesses insolubility in all commonly known volatile solvents, is quite impervious to water, and possesses resistance to temperatures which will adversely affect almost all other known organic polymeric, film-forming substances. Moreover, the compound has higher resistance to corrosive materials such as acids, alkalis and the like, than any resin known, and also possesses a uniquely low coefficient of friction thereby rendering the material highly resistant to abrasion. The material further has unusual electrical properties; e.g., high dielectric strength, high insulation resistance and extremely low power factor. The material is also unusual in that it provides an anti-stick surface. As a result of these foregoing characteristics, this material has received widespread usage in the manufacture of insulators for electrical components, bearings, packings, coatings, liners, and many other fields where such properties are desirable.

Although the polytetrafluoroethylene polymers have these many desirable characteristics, they are subject to several disadvantages which has limited their use. For example, in the application of polytetrafluoroethylene polymers in sheet or solid form as a bearing, the polytetrafluoroethylene has had a tendency to "cold flow" under moderate to high loads. This property of the Teflon in sheet form is highly undesirable since it does not perform its intended function. The development of the polytetrafluoroethylene in fiber form has tended to overcome the problem of "cold flow" in many bearing applications. The reason for this is that the highly oriented molecular structure of the polytetrafluoroethylene filaments in fiber form are resistant to loads more than ten times that of the polymer in solid or sheet form.

Teflon also has the disadvantage that the bond formed between it and the surface to be coated or laminated, whether it be metal, ceramic ware, or over another resin, has been either non-existent or extremely weak. Moreover, since the resins are insoluble in known solvents and hence must be applied as suspensoids, they have poor covering properties and will not cover irregular surfaces such as rough weld seams, crevices, apertures or pits in the surface, or seams resulting from two pieces of metal meeting at an angle. Further, such material will not cover sharp edges and corners, having a tendency to pull away, and if applied in too thick a coating, will tend to crack in a spidery pattern. Therefore, as a result of the poor bond, films consisting of polytetrafluoroethylene resins can be more like an "envelope" than a true coating having a good bond. This is highly undesirable in that if a coating is imperfect, or if it is scored or scratched or otherwise damaged so that the metal is exposed, any corrosive fumes or solutions which come in contact therewith will come between the film and the coated surface and substantially all of the bond is lost to such an extent that it may float away or can be lifted from the coated surface.

In the light of the many advantages possessed by the polytetrafluoroethylene considerable time, effort, and money have been devoted to provide a solution for the problem of the poor or non-existent bonding characteristics of both the solid and fiber material to metal surfaces. For example, it has been proposed to provide barrier layers and the like possessing adhesive characteristics between the polytetrafluoroethylene and the metal surface. This has not been too satisfactory due to the poor adhesive characteristics of the polytetrafluoroethylene toward any dissimilar material. Much activity has also been devoted in the development of particular adhesives which would effectively bond polytetrafluoroethylene to the metal surface, but to date no really satisfactory adhesive for this purpose has been fully developed. There has been work conducted recently relative to the surface energies of Teflon and other inert polyhalohydrocarbon substances that has been quite informative with respect to the fundamental mechanisms of adhesion of these materials. This activity may result in the development of bonding untreated Teflon to various substrates, but at this time such work is in a highly experimental state.

In a further effort to achieve the desired bonding, polytetrafluoroethylene fibers have been woven or otherwise formed in cloth-like layers in an attempt to place this material in a state suitable for bonding. It has been proposed that in the weaving of the cloth or forming of the cloth-like layer, fibers of filaments of an easily bondable polymeric material be utilized such that the easily bondable fibers would form an excellent bond with the metal surface. To date, none of these alternate proposals has been completely satisfactory, either from the standpoint of cost, reduction of desirable properties, imperfect or poor bonding characteristics, or the like. The straight Teflon fabrics cannot be bonded well and the poorer performing Teflon-cotton fabrics are often used.

It has been found in accordance with the present invention that the foregoing and related disadvantages can be eliminated by using a woven Teflon fabric, treating only one surface thereof with a material capable of etching the polytetrafluoroethylene to etch only one face thereof, applying an adhesive film to an absolutely clean metal surface, placing the etched surface of the Teflon fabric over the adhesive film and the metal, and bonding the adhesive film to the metal surface. This operation results in a metal article having polytetrafluoroethylene in fabric form strongly bonded to the metal article. The laminated article in this state possesses all of the desirable characteristics of high strength and resistivity, low coefficient of friction and the like, as hereinbefore enumerated, thereby making it suitable for use in a great many different fields.

It is therefore a principal object of the present invention to provide metal article or surface having a polytetrafluoroethylene fabric bonded thereto.

Another object of the present invention is the provision of a metal article or surface thereof having a polytetrafluoroethylene fabric bonded thereto in a new and novel manner.

Another object of the present invention is the provision of a polytetrafluoroethylene fabric-laminated metal article possessing all the advantages of polytetrafluoroethylene in a non-bonded state.

Yet another object of the present invention is the provision of a new and novel method for the bonding of a polytetrafluoroethylene fabric to a steel surface.

Another object of the present invention is the provision of a metal article having a polyeterafluoroethylene fabric bonded thereto to produce a laminated article highly resistant to wear.

A further object of the present invention is the provision of a new and novel method for treating a woven polytetrafluoroethylene fabric to place it in a state suitable for effectively bonding it to a metal surface.

Yet another object of the present invention is the provision of a new and novel method of applying adhesive to a polytetrafluoroethylene fabric for effectively bonding same to a metal article.

Still another object of the present invention is the provision of a new and novel method for bonding a woven polytetrafluoroethylene fabric to a metal surface whereby the laminated article will be particularly useful as a bearing member.

Other objects and advantages and features of novelty of the invention will be specifically pointed out or will become apparent in referring, for a better understanding of the invention, to the following description.

Broadly stated, the process of the present invention for the laminating of a woven polytetrafluoroethylene fabric to a metal surface comprises applying an adhesive material having affinity for metal to a clean metal surface, placing a polytetrafluoroethylene fabric having one face thereof chemically etched over the adhesive material with the etched face down, and applying heat and pressure thereto to bond the polytetrafluoroethylene to the metal surface.

To the accomplishment of the foregoing and related ends, the present invention consists of the means hereinafter fully described and particularly pointed out in the claims and the following description setting forth in detail certain means in the carrying out of the invention, such disclosed means illustrating, however, but one of the various ways in which the principal of the invention may be employed.

The polytetrafluoroethylene fabric to be employed in the present invention may be any cloth-like material made from filaments of polytetrafluoroethylene. The cloth may be made by weaving yarns of polytetrafluoroethylene filament of any suitable denier and in any desired weave, including braiding. The weave preferably is tightly woven, but it is to be clearly understood that an open mesh weave can be employed equally as well. It is to be noted that it is clearly within the scope of the present invention to produce a cloth from threads containing filaments of polytetrafluoroethylene, either used alone or blended with fibers or filaments of other synthetic or natural material capable of being bonded to a metal surface. Fabrics made from both polytetrafluoroethylene alone and the blends of polytetrafluoroethylene fabrics and other fibers which may be employed in the present invention are readily available commercially.

While the polytetrafluoroethylene is generally employed in the present invention in the form of a woven sheet, it should be noted that under certain circumstances and for certain uses it will be possible to employ a non-woven bat of polytetrafluoroethylene fibers so long as the bat will be in a highly compact mass and will possess the necessary strength and rigidity. It is also to be noted that it is possible to employ in the present invention so-called filled polytetrafluoroethylene sheets in which the polytetrafluoroethylene and fibers and fillers of other materials, such as, for example, glass fibers and the like, are blended with one another to form a filled sheet. An example of this type of filled sheet is the sheet sold under the trade name "Rulon." It is to be understood that these materials will be employed only under special and particular fields of use, and will not possess the general utility to the same extent as the woven polytetrafluoroethylene.

In effecting the desired bonding of the polytetrafluoroethylene fabric, one surface only is to be subjected to a chemical etching such that there will be a partial chemical degradation of the surface. The surface of the polytetrafluoroethylene treated in this manner will possess an affinity for the adhesive such that the polytetrafluoroethylene can become bonded to the metal surface by means of an adhesive. The surface of the polytetrafluoroethylene is to be etched in a particular manner, as will be more fully pointed out hereinafter, with a solution possessing a property of etching the polytetrafluoroethylene. There are several materials that have been found suitable for use in effecting the desired etching and which are readily available commercially. A particular and preferred one is metallic sodium marketed under the trade name "Fluoretch." Other etching materials that can be employed are alkoxides of the metals of Groups I, II, and III of the Periodic Table, the metal of which can be sodium, potassium, lithium. The alkoxide is derived from any alcohol having an alkyl group of 1 to 8 carbon atoms. Suitable examples of such alkoxides are the alkali metal alkoxides, and particularly sodium methoxide and sodium ethoxide.

The adhesive to be employed in the present invention in effecting the desired bonding may be any structural adhesive which will form a strong bond with a metal surface and which will have a fairly strong degree of affinity for the surface of the polytetrafluoroethylene fabric after the surface has been treated in the manner hereinbefore discussed. The adhesive may be one which is activated by heat, or it may be an adhesive that is effective when applied at room temperature. Suitable adhesives that may be employed in the present invention are epoxy adhesives, phenolic-nitrile adhesives, vinyl-phenolic adhesives, acrylic adhesives, silicon adhesives, polyurethane, and the like. The adhesive, if liquid, may be applied without a liquid carrier or it may be applied in solutions thereof in water, or in organic solvents. Also, with many adhesives the adhesive will be in a preformed state in the form of a thin sheet or film thereof. Also, in certain instances the adhesive may be applied in the form of a hot melt. Adhesives of the foregoing type suitable for use in the present invention are readily available commercially. For example, suitable adhesives may be a vinyl-phenolic adhesive marketed under the trade name "FM-47," Supported Film, Type II. Epoxy resins are marketed under the trade name "Epon".

The surface or substrate to which the polytetrafluoroethylene fabric is to be bonded may be any desired metal, such as, for example, iron, steel, ferrous alloys, aluminum, copper, etc., or non-metals, such as, for example, glass reinforced plastic, and the like. The surface to which the polytetrafluoroethylene fabric is to be applied should, as will be pointed out more fully hereinafter, be subjected to a thorough cleaning operation to insure the desired bonding of the fabric to the surface.

The invention will be described more particularly in connection with the preparation of a steel member having a woven polytetrafluoroethylene fabric bonded thereto with the formed article being for use as a bearing member. However, the principles and advantages of the invention as well as the novelty thereof will be equally applicable to other metals, other forms of polytetrafluoroethylene fabrics, and different adhesives.

In the bonding of the woven polytetrafluoroethylene fabric to the steel article, the metal surface thereof which is to be the recipient of the fabric should be placed in an absolutely clean state before any bonding is to be attempted. In the cleaning of the steel member for production of a bearing member, the surface of the steel insert plate which will receive the fabric is machined to place it in a relatively smooth state. For example, a 125 microinch R.M.S. finish is usually adequate. After the surface of the steel member has been machined to the desired degree of smoothness, a conventional cleaning composition or degreasing solution is applied thereto to remove dirt, grease and other foreign material therefrom. The cleaning composition is then wiped off or otherwise removed from the surface leaving it in a very clean state. The metal surface treatment of the steel insert just described is a generally conventional and standard procedure normally followed in the preparation of a steel body to which a coating or the like is to be applied. As such, the cleaning operation to this point does not form an essential part of the invention other than that the metal to be bonded with the Teflon fabric must be placed in a very clean state in some manner.

It will be found highly advantageous in achieving the desired bond between the fabric and the metal to effect a final cleaning of the desired surface. To achieve this final state of high cleanliness, levigated alumina or similar fine powder is placed in water forming a water paste which then is applied to the cleaned surface of the metal and vigorously rubbed thereover. After a sufficient period of time, to effect a thorough surface operation, the paste is removed therefrom by wiping or the like leaving an extremely clean surface. Extreme care should be taken not to touch or otherwise contact or soil the treated surface in any way. The fabric receiving surface of the steel member is now in the desired condition and the bonding of the Teflon fabric to the metal should be started within an hour after the final cleaning and polishing has been completed.

The woven polytetrafluoroethylene or Teflon fabric is also now to be treated to place one surface thereof in a condition such that it will be receptive to an adhesive thereby achieving the desired bonding of the fabric to the highly polished surface of the steel member. In performing the desired surface treatment, the side of the fabric which will have the wearing or non-bonding face is first coated by applying a thick paste of a rubber latex or the like thereon and permitting same to dry thereon. This results in a solid covering on the non-bonding face of the fabric which will remain thereon throughout the surface treatment of the fabric preparatory to bonding. The function of the dried latex film or coating is to provide a protective layer or mask for the wearing face of the polytetrafluoroethylene fabric such that there will be no contact of this face with any subsequently applied treating solution.

The uncoated face of the polytetrafluoroethylene fabric which will be bonded to the surface of the steel member is now in a condition to be subjected to an etching solution to impart adhesive receptivity characteristics thereto. The etching solution, which may be metallic sodium in a solvent or any other suitable etchant of the type hereinbefore described, is applied at room temperature to the uncoated side of the fabric very carefully by brushing, dipping, or any other suitable manner. The etching action between the solution and the Teflon fabric is virtually instantaneous and results in a partial chemical breakdown of this face of the fabric in the manner hereinbefore indicated. Due to the latex mask on the opposite face of the fabric, this surface will have no etching action thereon. Due to the high degree of reactivity of etching solutions of this type, and particularly in an atmosphere where there is an excessive amount of moisture, the etching operation should be carried out in an inert and dry atmosphere, such as, for example, a dry nitrogen atmosphere. The mechanics that may be employed in accomplishing this may be any suitable means, such as, for example, placing the fabric in a closed area into which dry nitrogen has been pumped and applying the etching solution to the free surface of the fabric.

The etched surface of the polytetrafluoroethylene fabric is then washed with water to remove all traces of the etching solution and the fabric surface permitted to be dried thoroughly. The latex coating or film is now peeled or stripped from the opposite face of the fabric and discarded, leaving this side in a complete unetched condition. The etched surface of the Teflon fabric is now in a condition for being adhesively secured to the steel member.

To bond the etched surface of the polytetrafluoroethylene fabric to the polished surface of the steel, the metal surface receiving the fabric is primed with a solution of the adhesive to be used or other effective primer and permitted to dry thereon. The adhesive to be employed may be in a liquid state or a preformed film, as hereinbefore indicated, and may be any suitable adhesive of the type previously enumerated. The adhesive, when in the form of a preformed film, is placed over the primed surface of the steel article and the etched surface of the Teflon fabric placed over the adhesive film. A release agent of the type which will prevent any material from adhering to the Teflon fabric is next placed over the non-etched or wearing surface of the polytetrafluoroethylene fabric. A suitable release agent for this purpose is a formed Teflon film. To insure an even application of load during the ultimate bonding of the Teflon and steel, an uncured rubber sheet is placed over the release agent, film, or layer. Uncured rubber sheeting of this type is readily available commercially and is marketed for the purpose of maintenance of an even application of force during a molding operation. A metal rack or form is then placed over the rubber sheet to keep the rubber from extruding out during any subsequent molding operation. The rack with the steel member, adhesive, fabric, release agent and rubber sheet is placed into a molding press where the assembly is subjected to an initial preheating operation in the absence of applied pressure to drive off any solvents or moisture that may be present in the assembly. After the preheating system has been completed, pressure is applied to the mold and assembly to complete the desired bonding of the Teflon to the steel member. In general, the specific pressure and temperature to be applied in the final bonding operation will depend upon the nature of the particular adhesive system and the manufacturer's recommendation for its use. The temperature normally will be in the range of 275° F. to 350° F. since the temperature above the maximum will tend to degrade the adhesive bond. Moreover, a temperature below the enumerated lower value will result in a prolonged molding operation, which is undesirable. The time of contact in the molding operation will also vary and will, in general, be from 10 minutes to four hours total time including the preheating and the final pressure molding. After cooling of the mold and the pressure is released, the assembly is taken from the mold and the rack, rubber sheet and release agent are removed. This results in a steel article having the polytetrafluoroethylene fabric bonded to the metal surface in tight engagement. The Teflon bonded steel member assembly is now trimmed to the desired size and is ready for final conditioning into the desired bearing member.

In effecting the bonding of the polytetrafluoroethylene fabric to the steel member in an operation in which no pressure or a mold is to be employed, a liquid adhesive, such as, for example, an epoxy resin, may be used. In this modification using a liquid adhesive with no pressure, the surface of the steel member which is to receive the fabric is cleaned and polished in the same manner as hereinbefore described for the pressure molding operation. The polytetrafluoroethylene fabric is likewise conditioned in the same manner as hereinbefore described. With this modification using a liquid adhesive, a fresh smooth coat of the latex film may be again utilized as a maskant against the adhesive during the ultimate bonding operation. In the utilization of the latex film in this manner, the latex may be applied to the bearing side of the fabric by spray or brush in as smooth a manner as possible. The epoxy resin or other suitable liquid adhesive is spread over the smooth surface of the steel member to which the polytetrafluoroethylene fabric is to be bonded and allowed to stand until the adhesive layer has reached a partial gel state.

To achieve the ultimate bonding of the fabric to the metal, the etched surface of the polytetrafluoroethylene fabric is pressed or rolled into firm engagement with the adhesive containing surface of the metal member. No uncured rubber sheet, release agents, molding rack or the like will be required or used in this modification. In effecting the bonding utilizing the liquid adhesive, heat can be applied to the latex film surface by means of a warm iron or the like. This heat operation will result in an activation and flowing of the adhesive and a drawing up of a small amount of the adhesive into the interstices of the Teflon fabric to enhance the ultimate bond. The presence of the latex film will act as a barrier member and will prevent any of the adhesive from flowing over the wearing surface of the fabric.

After the heat application has been completed, the assembly is permitted to cure overnight at room temperature. Thereafter, the assembly is subjected to a post curing operation at an elevated temperature to fix the ultimate bonding of the fabric to the surface of the metal member and after any desired finishing operation, the bonded assembly is ready for use as a bearing member. The temperature to which the assembly is subjected during the post curing operation will be dependent upon the resin employed. In general, the manufacturer's recommendations for the particular film should be followed to achieve the desired final curing.

Under many circumstances, where, for reasons of time or other factors, the use of a latex maskant is not possible during the adhesion operation, this step can be eliminated. When a latex maskant is not to be employed, it would be found desirable during the operation utilizing a liquid adhesive to have a small amount of the liquid adhesive to be drawn into the interstices of the fabric and also to some extent on the surface to insure a strong bonding action. It has been found that permitting the adhesive to flow to some extent on the wearing surface of the fabric will not impair materially the wearing or frictional characteristics or other properties of the Teflon fabric. Under such circumstances, after the etched surface of the polytetrafluoroethylene fabric has been placed against the adhesive surface of the steel member, a warm cloth iron is applied directly to the wearing surface of the fabric and the fabric is pressed onto the steel member. The adhesive will be activated and a small portion will be drawn up through the interstices of the fabric, and also to some extent on the wearing surface. The assembly is now subjected to an overnight curing operation and a post curing in the same manner as the form described utilizing the latex film as the bearing.

If the adhesive present on the wearing surface is found to be objectionable or excessive immediately following the use of the warm iron, the wearing surface of the fabric may be treated with a slight amount of suitable solvent for the adhesive by means of wiping a solvent dampened cloth or the like thereacross. This operation will result in a removal of any excess adhesive from the top surface of the fabric. However, care should be taken in the utilization of a solvent operation to insure that no excess solvent is absorbed by the fabric, which would result in a dissolving of the adhesive on the underside of the fabric. This solvent operation will result in an adhesive-free wearing surface of the bonded assembly. Another advantage of a solvent actuation over and above the removal of the adhesive from the wearing surface of the fabric is that the solvent will tend to make the bleed-up of the adhesive through the interstices of the fabric more uniform.

In order to more fully and further illustrate in greater detail the process of the present invention, the following examples, which are offered for purpose of illustration and which are not to be constructed as necessarily limiting, are given:

Example 1

A piece of tightly woven Teflon fabric, designated T–81–22, and having a thread count of 142 x 46 and weighing 23.91 oz./sq. yd. was cut to an 18" x 20" dimension. The substrate to which the fabric was to be bonded was a 16½" x 18" steel wedge plate. The fabric was coated on the bearing or non-bonding surface with a thickened latex coating, the coating being made from Latex 1–V–10 thickened with Vultex T–17, both being made by General Latex and Chemical Co., Cambridge, Mass. The latex coated fabric was placed in a drying oven and dried overnight at 130° F., after which it was laid out inside a large polyethylene bag and the technician's hands taped inside the bag along with a container of a Teflon etching solution, the solution being "Fluoretch." Dry nitrogen was pumped into the bag continuously for at least 5 minutes and vented out through a small hole. The etching solution was poured out in small amounts and quickly spread over the surface of the fabric which was to be bonded. This contact was continued until the surface of the fabric had been completely discolored, after which the fabric was removed from the bag and washed with water. The latex coat was next stripped from the fabric and the fabric was dried in a drying oven at 130° F. for a little over 4 hours.

The steel insert plate was cleaned with a degreasing solvent to remove any grease or oil from the surface which was to receive the fabric. Levigated alumina in a water-paste form was rubbed all over the steel surface with frequent changes in the paste. An orbital sander was used with a cloth to facilitate the cleaning. The wetting of water on the surface was used as an indication to determine when the steel surface was clean. After the levigated alumina was removed from the surface, the surface of the steel was dried and primed with a light coat of FM–47 adhesive solution, and dried at 200° F. for 4 hours.

An adhesive film obtained under the name FM–47, Type II supported, was cut to the dimensions of the fabric and placed over the primed steel surface with the major threads thereof running in the direction of motion. The Teflon fabric with the etched side in contact with the adhesive film was placed over the rubber film and an iron set at a temperature of 250° F. was then applied to the bearing surface of the fabric and the fabric ironed out. A sheet of solid Teflon 1⁄16" thick and having the dimensions of the steel wedge plate was laid on the bearing surface of the Teflon fabric and a sheet of Press-to-Flo, an uncured rubber molding aid obtained from Bloomindale Rubber Co., was next placed over the solid Teflon sheet. Two plies of ¼" thick Teflon sheet of the same dimensions as the molding aid were applied over the molding aid, and a steel rack having the inside dimensions of 16¾" x 18¼" and made from 1" x ½" bar stock welded together was placed over the assembly to enclose the Press-to-Flo molding aid. The assembly was next mounted in a large press with the platen temperature set at 350° F. After 30 minutes of preheating of the assembly at this temperature, a pressure of 23–25 tons was applied and maintained for 10 minutes, after which the temperature was shut off. After an additional 20 minutes, the pressure was reduced to 10 tons and the assembly allowed to cool and removed from the press, with a total processing time of 3 hours and 15 minutes occurring for the molding operation. The rack, the Press-to-Flo molding aid and the solid Teflon sheet were removed and the fabric trimmed and oiled with a lubricant.

The plate was tested in the GD/EB Test Stand at loads up to 8000 p.s.i. and at varying speeds. The formed bearing plate exceeded all performance requirements for friction and wear life for over 2500 simulated mill hours.

When subjected to a 90° peel test, the adhesive strength of the bearing plate was found to be 11 lb. p.s.i.

Example 2

A piece of tightly woven Teflon-Dacron fabric, designated T-56-20, and having a thread count of 163 x 110 and weighing 17.71 oz./sq. yd. was cut to a 21" x 20" dimension. The substrate to which the fabric was to be bonded was a 20" x 20" steel insert plate. The fabric was coated with latex and etched in the same manner as the fabric Example 1 with the steel insert being degreased and cleaned in the same manner as in Example 1. After the steel insert was thoroughly cleaned and dried, one surface was primed by adding a light coat of BR-227A primer and the coating dried at 200° F., for 4 hours. An epoxy adhesive using aromatic and aliphatic amine blend as hardeners and a wetting agent additive were applied to a thickness of 8-10 mils on the primed steel surface and allowed to stand for 5 hours to reach a partial gel. The bearing surface side of the fabric was recoated with the latex coating employed in the etching operation with extreme care being employed to insure an even coating free of brush marks on the fabric. The fabric was dried for 4 hours at 200° F. and placed on the epoxy adhesive surface and rolled out uniformly. A warm iron was applied over the bearing surface of the fabric to draw the adhesive up through the fabric. A sheet of polyethylene was spread over the assembly and vacuum drawn and maintained in this state until the adhesive gelled. The Teflon-Dacron coated plate was post cured the next day for 3 hours at 175° F., the latex coating removed and the edges trimmed and the system oiled. When subjected to a 90° peel test, the adhesive strength of the bearing plate was found to be 10-12 lbs. p.s.i.

Example 3

A duplicate of the fabric and steel insert of Example 2 were treated in the same as in Example 2 with the exception that the bearing surface of the fabric was not recoated with latex. When the fabric was placed on the adhesive film and ironed out, the adhesive was drawn up through the fabric with an excess appearing on the bearing surface. The excess adhesive drawn up by the warm iron was wiped off from the bearing surface by rubbing with a cloth dampened with an acetone solvent very lightly over the whole surface. A sheet of 1" thick flexible foam was placed over the bearing surface followed by a ¾" thick piece of plywood. About 30 lbs. pressure was placed evenly over the plywood and the assembly allowed to cure overnight and then post cured the next day for 3 hours at 175° F. and the edges trimmed and the system oiled. When subjected to a 90° peel test, the adhesive strength of the bearing plate was found to be 10-12 lbs. p.s.i.

While the present invention has been described hereinbefore with respect to polytetrafluoroethylene, it is to be understood that it is within the spirit and scope of the present invention to employ other resins falling within the class of the polyhalocarbon resins, of which polytetrafluoroethylene is a member. Illustrative examples of additional resins which may be found suitable for use in the present invention, and which have properties similar to polytetrafluoroethylene, are the following:

High molecular weight homopolymer of monochlorotrifluoroethylene, known as Kel-F300, low molecular weight homopolymer of monochlorotrifluoroethylene, known as Kel-F270, low molecular weight copolymer of monochlorotrifluoroethylene and a relatively large amount of vinylidene fluoride, known as Kel-F800 and Kel-F820, copolymer of monochlorotrifluoroethylene and a relatively small amount of vinylidene fluoride, known as Kel-F550 and Genetron VK-240, homopolymers of vinyl fluoride; films with a melting point of approximately 390° F. and oriented to different extents, known as Teslar 20, 30 and 40, etc.

I claim:
1. A method of bonding a cloth-like layer containing polyhalocarbon filaments to a clean metal surface comprising the steps of applying a layer of adhesive material having an affinity for the metal to the clean metal surface to which the cloth-like layer is to be bonded, masking one surface of the cloth-like layer with a masking film by applying to said surface a coating of a thick paste of a rubber latex, drying said rubber latex to form a solid covering on the non-bonding face of the cloth-like layer to protect said non-bonding surface from being contacted by a subsequently applied chemical etchant, applying a chemical etchant to the unprotected surface of the cloth-like layer, placing the etched surface of the cloth-like layer against the adhesive layer on the metal surface, and applying heat thereto to bond the cloth-like layer to the metal surface.

2. A method according to claim 1 including the step of applying pressure simultaneously with the application of heat during bonding of the layer to the metal surface.

3. A method according to claim 1 including the step of removing the masking film after etching and applying a further mask during bonding of the cloth-like layer to the metal surface.

4. A method according to claim 1 including the step of applying a solvent for the adhesive material to the exposed face of the cloth-like layer after bonding to remove excess adhesive therefrom.

5. The method of bonding a polytetrafluoroethylene fabric to a metal surface comprising applying a barrier film to one face of the poytetrafluoroethylene fabric by applying to said face a coating of a thick paste of a rubber latex, drying said rubber latex to form a solid covering on the non-bonding face of the fabric to protect said non-bonding face from being contacted by a subsequently applied chemical etchant, applying a chemical etchant to the unprotected face of the fabric, removing the barrier film from the fabric, applying a preformed adhesive film to the clean metal surface to which the fabric is to be bonded, placing the etched face of the fabric against the adhesive surface, and applying heat to the non-etched face of the fabric along with a pressure sufficient to draw a portion of the adhesive into the interstices of the fabric and to bond the fabric to the metal.

6. The method of bonding a polytetrafluoroethylene fabric to a metal surface comprising applying a barrier film to one face of the polytetrafluoroethylene fabric by applying to said face a coating of a thick paste of a rubber latex, drying said rubber latex to form a solid covering on the non-bonding face of the fabric to protect said non-bonding face from being contacted by a subsequently applied chemical etchant, applying a chemical etchant to the unprotected face of the fabric, removing the barrier film from the fabric, applying an adhesive to the clean metal surface to which the fabric is to be bonded, reapplying a fresh coat of the barrier film on the non-etched surface of the fabric, placing the etched face of the fabric against the adhesive surface, applying heat to the barrier film along with sufficient pressure to draw a portion of the adhesive into the interstices of the fabric and not on the non-etched surface thereof and to bond the fabric to the metal and removing the barrier film.

References Cited

UNITED STATES PATENTS

| | | | |
|---|---|---|---|
| 2,809,130 | 10/1957 | Rappaport | 161—189 X |
| 2,833,686 | 5/1958 | Sandt | 156—309 |
| 2,907,612 | 10/1959 | White | 161—189 X |
| 3,055,788 | 9/1962 | Stanhope et al. | 156—247 |
| 3,249,478 | 5/1966 | Brevik | 156—6 |
| 3,329,554 | 7/1967 | Hencken | 161—81 |

ROBERT F. BURNETT, *Primary Examiner.*

R. L. MAY, *Assistant Examiner.*